US011422542B2

(12) United States Patent
Aslan et al.

(10) Patent No.: US 11,422,542 B2
(45) Date of Patent: Aug. 23, 2022

(54) WORKPIECE SURFACE QUALITY ISSUES DETECTION

(71) Applicant: Siemens Aktiengesellschaft, Munich (DE)

(72) Inventors: Murat Samil Aslan, Bad Neustadt (DE); Tigran Bagramyan, Bad Kissingen (DE); Andrey Glushkov, Bad Neustadt a. d. Saale (DE)

(*) Notice: Subject to any disclaimer, the term of this patent is extended or adjusted under 35 U.S.C. 154(b) by 0 days.

(21) Appl. No.: 17/276,045

(22) PCT Filed: Sep. 6, 2019

(86) PCT No.: PCT/EP2019/073814
§ 371 (c)(1),
(2) Date: Mar. 12, 2021

(87) PCT Pub. No.: WO2020/053086
PCT Pub. Date: Mar. 19, 2020

(65) Prior Publication Data
US 2021/0356948 A1     Nov. 18, 2021

(30) Foreign Application Priority Data
Sep. 13, 2018 (EP) .................................. 18194310

(51) Int. Cl.
*G05B 19/418*     (2006.01)
*G05B 19/4068*    (2006.01)

(52) U.S. Cl.
CPC ... *G05B 19/41875* (2013.01); *G05B 19/4068* (2013.01); *G05B 2219/32177* (2013.01);
(Continued)

(58) Field of Classification Search
None
See application file for complete search history.

(56) References Cited

U.S. PATENT DOCUMENTS 6,266,570 B1     7/2001 Hocherl et al.
2007/0127819 A1  6/2007 Lee et al.
(Continued)

FOREIGN PATENT DOCUMENTS

CN     1208474 A     2/1999
CN   101559513 A    10/2009
(Continued)

OTHER PUBLICATIONS

Vorburger TV et al: "Post-Process Control of Machine Tools", Manufacturing Review, American Society of Mechanical Engineers, New York, US, vol. 7, No. 3, pp. 252-266, XP000467104, ISSN: 0896-1611 the whole document; 1994.
(Continued)

*Primary Examiner* — Sean Shechtman

(57) ABSTRACT

A method for checking the quality of a workpiece, a surface section of the workpiece is finished with a manufacturing device. A reference signal representing a time dependent difference between an ideal tool position and a real tool position of a tool of the manufacturing device in a reference phase is determined when finishing the workpiece. A test signal representing a time dependent difference between an ideal tool position and a real tool position of a tool of the manufacturing device in an operation phase is determined when finishing the workpiece. A mean value and a standard deviation value from the reference signal is determined. Data points of the test signal are determined, where the test signal deviates from the mean value more than a defined multiple of the standard deviation value. The surface quality of the workpiece is estimated by using the determined data points.

11 Claims, 3 Drawing Sheets

(52) U.S. Cl.
CPC ............. *G05B 2219/32194* (2013.01); *G05B 2219/45145* (2013.01)

(56) References Cited

U.S. PATENT DOCUMENTS

2017/0277174 A1   9/2017   Maeda
2018/0246495 A1   8/2018   Meier et al.

FOREIGN PATENT DOCUMENTS

| CN | 104657526 A | 5/2015 |
| CN | 106338521 A | 1/2017 |
| CN | 107292879 A | 10/2017 |
| CN | 108154167 A | 6/2018 |
| KR | 20070058983 A | 8/2007 |

OTHER PUBLICATIONS

PCT International Search Report and Written Opinion of International Searching Authority dated Feb. 6, 2020 corresponding to PCT International Application No. PCT/EP2019/073614 filed Sep. 5, 2019.

WORKPIECE SURFACE QUALITY ISSUES DETECTION

CROSS-REFERENCES TO RELATED APPLICATIONS

This application is the U.S. National Stage of International Application No. PCT/EP2019/073814, filed Sep. 6, 2019, which designated the United States and has been published as International Publication No. WO 2020/053086 A1 and which claims the priority of European Patent Application, Serial No. 18194310.1, filed Sep. 13, 2018, pursuant to 35 U.S.C. 119(a)-(d).

BACKGROUND OF THE INVENTION

The present invention relates to a method of detection of anomalies related to surface quality of a workpiece. Furthermore, the present invention relates to a manufacturing device including a tool section comprising a tool for finishing a surface of the workpiece. Additionally, the present invention is related to a respective computer program product.

Workpieces are often produced by CNC machines (computer numeric control). A specific example of such CNC machines is a CNC milling machine. The raw data according to which the workpiece has to be manufactured can be obtained from CAD/CAM (Computer-Aided Design/Computer-Aided Manufacturing) programs. The raw data has to be processed in order to control a tool section of a respective CNC machine or another manufacturing device. The processing of the raw data has to be performed individually for each type of manufacturing device.

The US patent application publication US 2018/0246495 A1 describes a manufacturing process data collection and analytics and a particular metric as associated with a performance of a machining process. Particular evaluations can be calculated and presented along with or in a separate visualization of the actual and expected paths or actions or action of the machine. A contouring error can be computed and visually presented in a plot. In this plot a critical region can also be indicated. By means of a contouring error, module deviations from the actual path of a tool as compared to the expected or commanded path as defined in the underlying instruction set can be calculated.

Actually the surface of a workpiece depends on the specific manufacturing device and the individual controlling signals for controlling the tool section of the manufacturing device. Thus, also surface issues resulting from the individual behaviour of the manufacturing devices are individual, too. They also depend on the material of the workpiece and the specific tool of the manufacturing device.

Usually, the position of the tool is measured by internal or external devices of the manufacturing device. The measured position of the tool in practice does not exactly correspond to the nominal position due to the forces acting on the tool and the noises involved in measurement of the tool position.

Typically, the scratches or other artefacts of a finished workpiece can be very small. Due to such small size of the surface artefacts, their detection requires separate measurement using high precision equipment or a manual visual assessment. That brings additional efforts that extend the time and cost of manufacturing.

In view of that it is the object of the present invention to propose a simplified method for estimating a surface quality of a workpiece finished by a manufacturing device. Furthermore, a corresponding manufacturing device shall be provided.

SUMMARY OF THE INVENTION

According to the present invention this object is solved by a method and a manufacturing device as well as a computer program product according to the independent claims. Further favourable developments are defined in the sub claims.

In a first aspect of the invention there is provided a method of detecting anomalies related to surface quality of a workpiece by estimating the surface quality. Such an estimation of the surface quality of a workpiece may be a necessary, for example, when the workpiece is finished by a numerically control milling machine. Specifically, it may be necessary to check if the workpiece has surface quality issues like scratches and other artefacts after the finishing operation in the manufacturing device like a CNC machine.

The inventive estimation method includes the step of finishing a surface of the workpiece with a manufacturing device. This step of finishing relates to a final operation of the manufacturing device when producing the workpiece. Specifically, the finishing step may be a polishing step with a specific polishing milling cutter. Indeed, the quality of the surface of the workpiece also depends on the individual character of the milling cutter. However, when judging the surface quality of the workpiece it may be sufficient to estimate the quality in dependence of signals of the manufacturing device or its controller.

For such simplified estimation of the surface quality the step of determining a reference signal representing a time dependent difference between an ideal tool position and a real tool position of a tool of the manufacturing device in a reference phase when finishing the workpiece may be employed. Such reference signal represents the deviation of a measured (real) position of the tool of the manufacturing device from a nominal (ideal) position. If there is a large difference between both signals, severe surface quality issues may result therefrom. The reference phase when finishing the workpiece may be determined manually or automatically by means of one or more thresholds related to the amplitude of the difference signal. The difference signal may be a reference signal when its amplitude is lower than such threshold.

Furthermore, the method includes a step of determining a test signal representing a time dependent difference between an ideal tool position and a real tool position of a tool of the manufacturing device in an operation phase when finishing the workpiece. The operation phase may be any phase when finishing the workpiece.

The reference signal is further processed for determining a mean value and a standard deviation value. Thus, two statistical features, i.e. the mean value and the standard deviation value, are gained from the reference signal. These two statistical features may be used to specify abnormalities of the surface or the surface quality.

Specifically, according to the inventive method there is included a step of determining data points of the test signal, where the test signal deviates from the mean value more than a defined multiple of the standard deviation value. This means that every data point may be specified, the value of which is further away from the mean value than a settable threshold. This threshold may be defined as a multiple of the standard deviation value. Thus, there is no fixed threshold, but a dynamic threshold which may be adapted depending on the reference signal as nominal signal for the finishing operation.

These determined data points being further away from the mean value may indicate problematic parts of the surface of the workpiece. Thus, in a last step of the inventive method the surface quality of the workpiece is estimated by using the determined data points. The estimation can be performed by a man watching the determined data points laying further away from the mean value. He may decide on his own experience whether the surface quality is sufficient for his specific purposes. When watching the finishing process together with problematic data points he can determine the position of the problematic surface sections. Alternatively, the surface quality is estimated automatically on the basis of the determined data points. In this case quality issues can be detected even by persons having low experience. In a further development a classification is performed, where the results of the finishing operation are classified into a surface quality class "sufficient" or in another surface quality class "not sufficient".

The advantage of the proposed method is that there may be presented a fully automated test for workpiece surface quality check which can be used either in real time during a manufacturing process or offline during a quality control. Unlike estimating solutions the inventive method does not require additional measurement equipment or any manual efforts and is based only on the controller data or measurement data available during processing. In any case the surface quality of the workpiece is estimated indirectly on the basis of tool measurement signals of the manufacturing device. Thus, it is not necessary to gain measurement data directly from the workpiece. This is possible, because the position of the manufacturing tool can be determined very precisely and the dimensions of the tool do not vary essentially during a finishing process.

In a specific embodiment the reference signal and the test signal are based on measurement signals obtained from a measurement device of a controller of the manufacturing device or from a measurement device external from the controller of the manufacturing device. The manufacturing device can measure the tool position at the tool holder or at the tip of the tool. Both signals can be pre-processes so that they are related to an ideal or nominal position for obtaining the reference signal and the test signal.

In a further embodiment the reference signal is a part of the test signal. In this case there is no separate and independent reference signal available. The reference signal will be gained from the test signal. If in a specific part of the operation phase there are no quality issues, this phase may be defined as reference phase for gaining the statistical values.

In a favourable embodiment, the test signal and the reference signal each have a plurality of data points, and each data point includes a sample of a relative position value of the tool. In this case the test signal and the reference signal each are a sequence of samples. The sequences may be referred to real time, but such reference is not necessary. The position value in the sample may be an absolute value or a relative value. Specifically, the relative position value is a difference between a real value being actually measured and a nominal value.

In a further favourable embodiment a moving direction of a finishing tool of the manufacturing device is not perpendicular to the surface section of the workpiece, and a coordinate transformation is performed on the reference signal and the test signal before determining the mean value and the standard deviation value, so that a transformed coordinate of both signals is perpendicular to the surface section of the workpiece. For example, if the driving axis of a cutter is not perpendicular to the surface of the workpiece but has an angle different from 90°, the driving signal for the tool section (e.g. including the cutter) does not directly represent increases and decreases of the surface of the workpiece. Thus, before estimating such increases and decreases of the surface a coordinate transformation should be performed, so that one coordinate is particular to the surface of the workpiece.

The method is only performed, if the reference signal and the test signal relate to a finishing operation of the manufacturing device. This can be done by filtering the raw reference signal and/or the raw test signal. Only those data points are preserved which relate to the finishing operation. If the manufacturing device performs other operations, specifically those where the tool is in the air, the corresponding reference signal and test signal are not provided or not used. Such limitation of the data points or signals reduces the data processing efforts.

In a further favourable embodiment the test signal and the reference signal are synchronized with each other. The reference signal of a specific finishing step should be compared to the test signal of the same finishing step. Such synchronisation is typically performed when two signals are compared. However, the synchronisation is not necessary, if the reference signal is generated from the test signal.

The step of determining a mean value and a standard deviation value from the reference signal is performed for data points of a sliding window. This means, that the mean value and the standard deviation value are gained from dynamic windows so that they are varying with time. Consequently, the mean value and the standard deviation value are dynamic values. Thus, the evaluation of the surface can be performed separately for each finishing step or finishing sequence. Specifically, it is necessary to adapt the mean value in short time periods. This can be guaranteed by using such sliding windows.

The size of the sliding window is individually defined for the specific workpiece to be finished. Then, the corresponding mean value and standard deviation value can be determined in shorter time so that the evaluation of the quality of the surface of the workpiece can be performed in real time for each small surface section. Furthermore, the finishing speed is an essential parameter when adjusting the window size. The speed may depend on the performance of the manufacturing device but also on the material of the workpiece. Thus, the window size may be different for different manufacturing machines, different tools and different materials of the workpiece.

In one embodiment the size of the sliding window corresponds to more than 100 data points and preferably lies between 500 and 2000 data points. In practice a typical sampling period lasts for e.g. 0.002 s. In this case, the total sampling time of a sliding window corresponds to 1 to 4 s. The high number of data points guarantees a reliable mean value and a reliable standard deviation value.

Moreover, there may be provided a method wherein the defined multiple of the standard deviation value is obtained by choosing a factor specific for the workpiece and/or step of finishing and multiplying the factor with the standard deviation value. This method step relates to a vertical window (in contrast to the horizontal window or time window described above) for evaluating the position value of the corresponding data point. Such a vertical window can be used to decide whether a data point represents an anomaly or not. The vertical window is centred around the mean value. If the position value of the data point lies outside the window it may be classified as anomalous. Otherwise, if the position value of the data point lies within the vertical window it may be classified as normal. The vertical dimension of the window may be determined by the factor (e.g. factor "alpha"). Preferably, the vertical dimension is a multiple of the standard deviation value. Thus, the vertical dimension of the window increases when the noise of the reference signal and thus its standard deviation value increases.

According to the present invention the above object is also solved by a manufacturing device including a tool section comprising a tool for finishing a surface section of the workpiece, comprising measuring means for determining a reference signal representing a time dependent difference between an ideal tool position and a real tool position of a tool of the manufacturing device in a reference phase when finishing the workpiece and for determining a test signal representing a time dependent difference between an ideal tool position and a real tool position of a tool of the manufacturing device in an operation phase when finishing the workpiece and calculating means for determining a mean value and a standard deviation value from the reference signal, determining data points of the test signal, where the test signal deviates from the mean value more than a defined multiple of the standard deviation value, and providing the determined data points for estimating the surface quality of the workpiece.

The advantages and variation possibilities described in connection with the inventive method also apply for the inventive manufacturing device. The specific method features can be regarded as functions of corresponding means of the manufacturing device.

The manufacturing device can be configured as CNC machine. Specifically, the CNC machine may be a milling machine. However, the CNC machine can also be a drilling machine, a lathe machine or another production machine. In any case, the control data are digital data so that the above problems may occur.

Additionally, there may be provided a computer program product comprising computer readable means, on which a computer program is stored, wherein the computer program when executed on a processor causes the processor to carry out a method as described above. Specifically, the processor may be implemented in the manufacturing device and the processor causes the manufacturing device to carry out the method.

BRIEF DESCRIPTION OF THE DRAWING

The present invention will now be described in more detail along with the attached figures showing in.

DETAILED DESCRIPTION OF PREFERRED EMBODIMENTS

The following specific embodiments represent preferred examples of the present invention.

Figure 1:
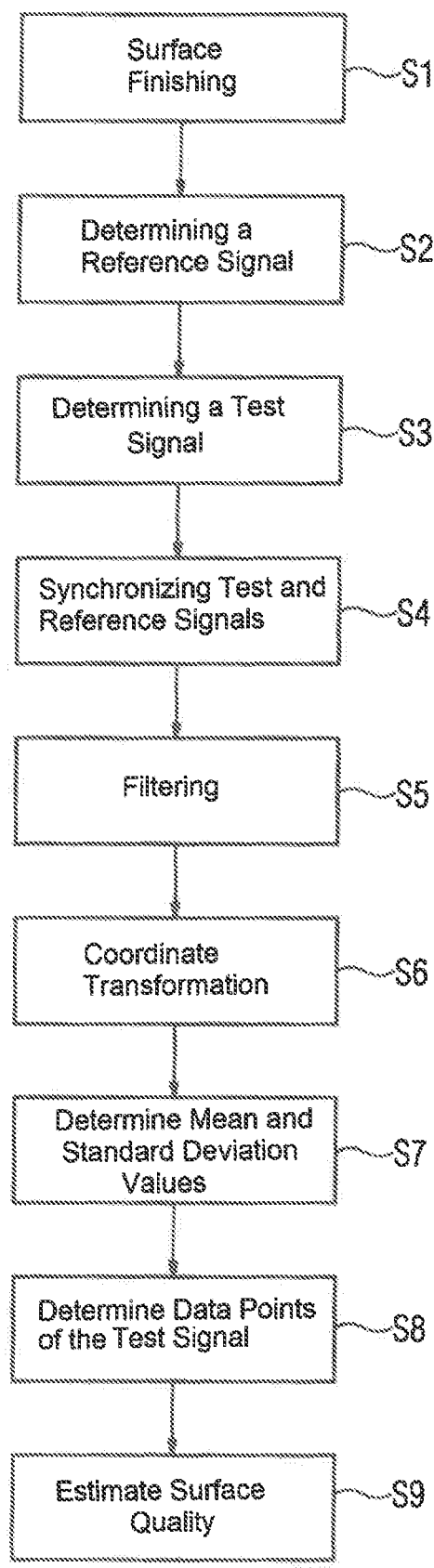
FIG. 1 a flow chart of an example of an inventive method.

The flow chart of FIG. 1 shows principal steps of a specific embodiment of a method for estimating a surface quality of a workpiece according to the present invention. In a first step S1 a surface section of the workpiece 7 (compare FIG. 2) is finishing with a manufacturing device 1.

Figure 3:
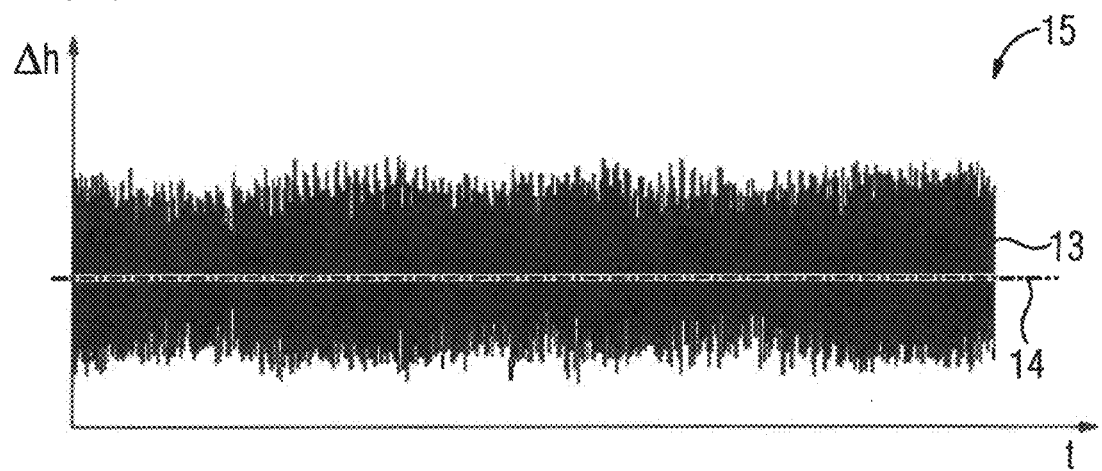
FIG. 3 a diagram of a reference signal.

In a second step S2 determining a reference signal 13 (compare FIG. 3) representing a time dependent difference between an ideal tool position and a real tool position of a tool 3 of the manufacturing device 1 is determined in a reference phase when finishing the workpiece 7. An example of such reference signal 13 is shown in FIG. 3. A reference signal is a difference between a real position of a tool and a nominal position of the tool of the manufacturing device. Typically it is noisy (see below).

In a third step S3 there is determined a test signal 16 (see FIG. 4) representing a time dependent difference between an ideal tool position and a real tool position of a tool 3 of the manufacturing device 1 in an operation phase when finishing the workpiece 7. In one embodiment the reference signal is gained independently from the test signal. In another embodiment the reference signal equals to the test signal at least temporarily.

In an optional fourth step S4 both signals, the reference signal and the test signal are synchronised. The reason for this step is that the reference signal and the test signal should represent the same sample region. However, it is not necessary to perform a highly exact synchronisation.

In an optional fifth step S5 there may be performed a filtering step. Only data points relating to finishing operations shall be evaluated. Other actions of the manufacturing device, specifically those where the tool is in air, are not of interest. Thus, in order to reduce the data amount the signals or data are filtered. Only those data remain which relate to the finishing operation.

In an optional sixth, step S6 a coordinate transformation may be performed. This transformation is necessary if the tool movement is not perpendicular to the surface of the workpiece. In this case an inclined movement of the tool should be transformed into a coordinate system with perpendicular and parallel axes to the surface of the workpiece.

In a seventh step S7 a mean value and a standard deviation value are determined from the reference signal. Preferably, the mean value and the standard deviation value are determined for data points of a sliding window. The position of the sliding window should be updated according to the actual position of the tool for real-time anomaly detection.

In an eighth step S8 data points of the test signal are determined, where the test signal deviates from the mean value more than a defined multiple of the standard deviation value. Thus, all data points are determined which lay outside a window defined by a multiple of the standard deviation value in both directions of the mean value. Thus, all data points are determined which lay too far away from a nominal position.

According to a ninth step S9 the surface quality of the workpiece is estimated by using the determined data points. This estimation may be performed manually or automatically. The result of the estimation may be a binary value representing e.g. "sufficient" or "not sufficient".

Figure 2:
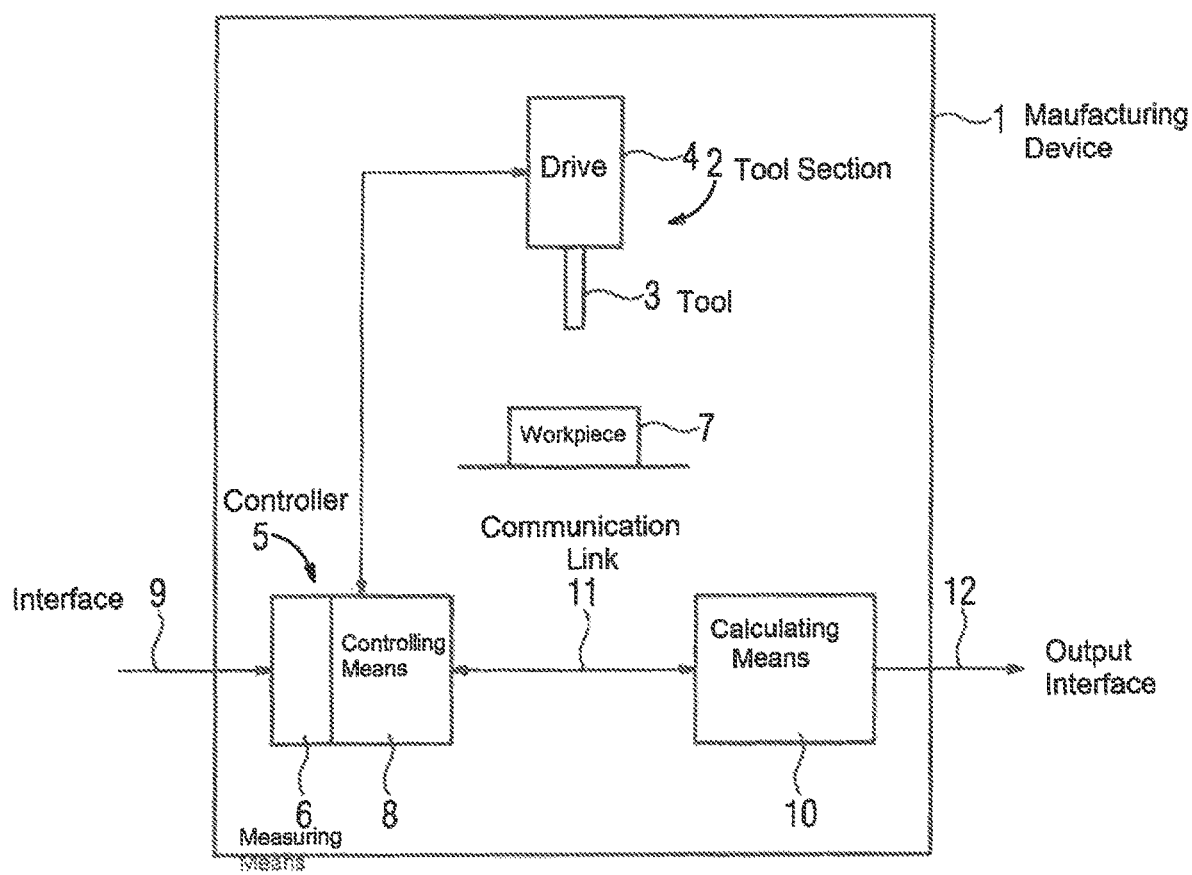
FIG. 2 a schematic block diagram of an inventive manufacturing device.

The block diagram of FIG. 2 shows the principal structure of a manufacturing device of an embodiment of the present invention. The manufacturing device 1 includes a tool section 2 comprising a tool 3 for finishing the workpiece 7. Additionally, the tool section 2 comprises a drive 4.

The manufacturing device 1 may further include a controller 5. The controller 5 may comprise measuring means 6 for determining a reference signal 13 representing a time dependent difference between an ideal tool position and a real tool position of a tool 3 of the manufacturing device in a reference phase when finishing the workpiece 7 and for determining a test signal 16 representing a time dependent difference between an ideal tool position and a real tool position of a tool 3 of the manufacturing device 1 in an operation phase when finishing the workpiece.

Furthermore, the controller 5 may comprise controlling means 8 for providing a control signal for tool section 2. Moreover, the controller 5 may comprise an interface 9 for communication with external devices.

A bidirectional communication may be established between the controller 5 and the tool section 2. Thus, the control signal can be sent from the controller 5 to the drive 4. Additionally, the tool section 2 may comprise a measurement unit (not shown in FIG. 2) for measuring the position of the tool 3. The respective measurement signal can be sent via the bidirectional communication linked to the measurement means 6 of the controller 5 in order to gain the reference or test signal.

The manufacturing device 1 also includes calculating means 10 for determining a mean value and a standard deviation value from the reference signal, determining data points of the test signal, where the test signal deviates from the mean value more than a defined multiple of the standard deviation value, and providing the determined data points for estimating the surface quality of the workpiece 7. The calculating means 10 may receive the reference signal and the test signal from the controller 5 via a communication link 11. Furthermore, the output information for estimating the surface quality of the workpiece may be provided from the calculating means 10 via an output interface 12.

The manufacturing device 1 may be a CNC machine like a CNC milling machine, a CNC drilling machine, a CNC lathe machine or the like.

In a specific embodiment the method for estimating the surface quality of a workpiece 7 may be based on the analysis of high frequency data from a CNC machine controller or an external measurement device. It may be assumed that the tool is perpendicular to the workpiece surface during the finishing operation and a corresponding signal of the z-coordinate represents the height of the tooltip relative to the workpiece surface. Otherwise, a corresponding coordinate transformation can be performed.

There is provided a reference signal 13 as shown in FIG. 3. The horizontal axis represents the time. Specifically, the data points are a sequence of samples, where each sample represents a sampling time. The vertical axis of FIG. 3 shows the difference between the real or measured position of the tool and the nominal position of the tool. This difference between real value and nominal value is noisy over time due to measurement artefacts, forces applied to the tool 3 or the like. The reference signal 13 has a mean value 14. This mean value 14 can be determined in a sampling window 15. Furthermore, a standard deviation can be calculated in the sampling window 15.

Figure 4:
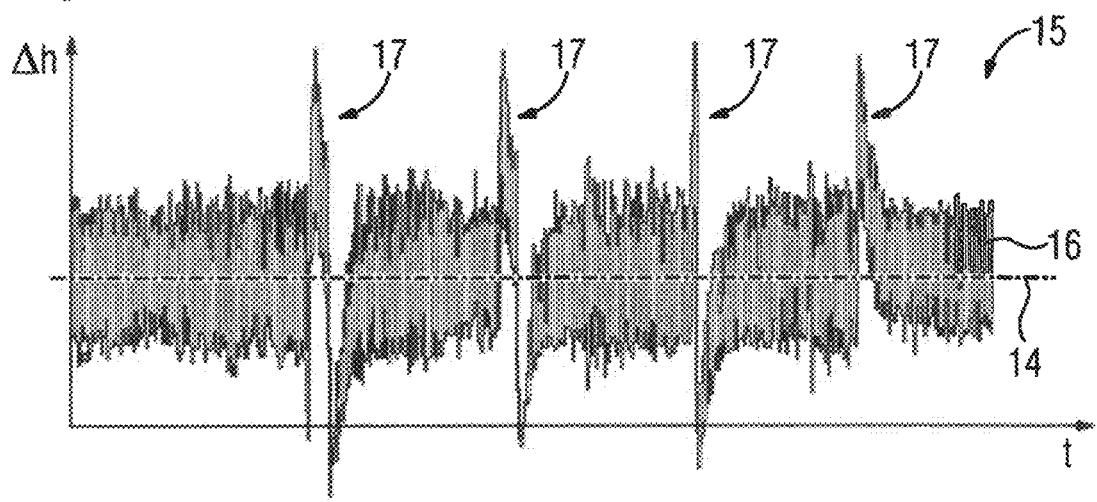
FIG. 4 a diagram of a test signal.

Besides the reference signal 13 there is provided a test signal 16 shown in FIG. 4 which serves for estimating the surface quality of the workpiece 7. The coordinates of FIG. 4 are the same as those in FIG. 3. The test signal 16 has a plurality of anomalous data points 17. They have a higher amplitude compared to the reference signal 13. This means that the difference between the real position value of the tool and the nominal position value of the tool is higher than usually. Therefore, these data points 17 represent anomalies.

Figure 5:
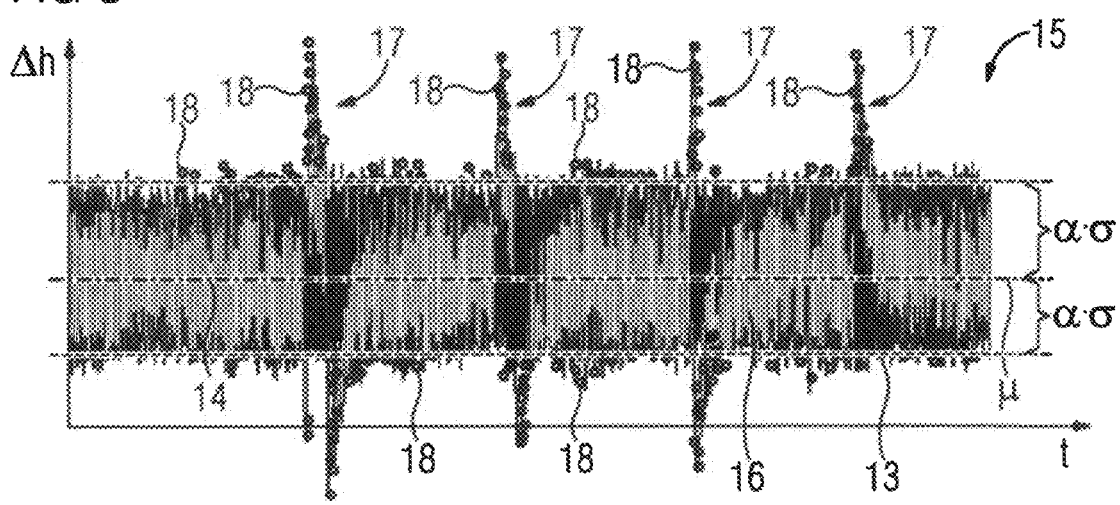
FIG. 5 a diagram with detected anomalous data points.

Specifically, the signal processing may include the following steps:

a) The signals are filtered in a way that only data points corresponding to finishing operation and actual processing (touching the surface) are preserved. Other operations, for example those when the tool is in air, are eliminated. The signals are also being synchronized, so that corresponding data points in both signals refer to the same processing step. This synchronization may not be perfect with some acceptable error defined in the next step.

b) Statistical features (mean value and standard deviation value) are extracted from the reference signal. These features may represent two vectors (sets of single values) of sliding mean values and sliding standard deviation values. To calculate them, a sliding sampling window 15 is generated with a size that can be defined for each type of workpieces individually. For instance, for a signal with a sampling period of 0.002 s the window size can be selected in the interval from 500 to 2000 samples. If appropriate, any other number of samples can be chosen for the sampling window 15.

c) For each value of the test signal a check is performed whether it represents an anomaly or not. Specifically, for a given data point in the test signal a window should be taken that includes this point. Then, a parameter a shall be chosen that will define the sensitivity of the algorithm to deviations in data. The product $\alpha*\sigma$ defines a size of an interval from mean value $\mu$ (compare also reference number 14), wherein a represents the standard deviation value and a the settable factor. If the signal value is lying outside of the interval $\alpha*\sigma$ from the mean value $\mu$, this data point may be marked as anomaly. Respective marks 18 show such anomalous data points in FIG. 5. The mean value $\mu$ and the standard deviation value a correspond to the mean value and standard deviation value calculated in the corresponding sampling window 15 of the reference signal 13.

The advantage of the embodiments of the present invention is that a fully automated test for workpiece surface quality check may be achieved. This quality check can be used either in real time during manufacturing process or offline during quality control. Unlike existing solutions it does not require additional measurement equipment or any manual efforts and is based only on the controller data available during processing.

The invention claimed is:

1. A method of finishing a surface of a workpiece and estimating a surface quality of the workpiece, said method comprising:

finishing the surface of the workpiece with a manufacturing device by controlling a tool of the manufacturing device with a control signal;

during the finishing of the surface of the workpiece, measuring a position of the tool with a measurement device to create a data point for each measured position of the tool, each data point including a sample of the position of the tool;

during the finishing of the surface of the workpiece, determining with the manufacturing device, based on a plurality of the samples, a reference signal representing a time dependent difference between an ideal tool position and a real tool position of the tool of the manufacturing device in a reference phase;

during the finishing of the surface of the workpiece, determining with the manufacturing device, based on a plurality of the samples, a test signal representing a time dependent difference between the ideal tool position and the real tool position of the tool of the manufacturing device in an operation phase;

only when the reference signal and the test signal relate to a finishing operation of the manufacturing device, executing the steps of:

during the finishing of the surface of the workpiece, determining with the manufacturing device, a mean value and a standard deviation value from the reference signal for data points of a sliding window, with a size of the sliding window being individually defined for the workpiece to be finished, and a finishing speed is a parameter when adjusting the size of the sliding window size;

during the finishing of the surface of the workpiece, determining with the manufacturing device, data points of the test signal, where the test signal deviates from the mean value more than a defined multiple of the standard deviation value; and estimating the surface quality of the workpiece by using the determined data points of the test signal.

2. The method of claim 1, wherein the reference signal and the test signal are based on measurement signals obtained from the measurement device of a controller of the manufacturing device or from the measurement device external from the controller of the manufacturing device.

3. The method of claim 1, wherein the reference signal is a part of the test signal.

4. The method of claim 1, wherein the test signal and the reference signal each have a plurality of data points, each of the data points of the test signal and reference signal including a sample of a relative position value of the tool.

5. The method of claim 1, further comprising:

moving a finishing tool of the manufacturing device in a moving direction which is not perpendicular to a surface section of the workpiece; and performing a coordinate transformation on the reference signal and the test signal before determining the mean value and the standard deviation value, so that a transformed coordinate of both the reference signal and the test signal is perpendicular to the surface section of the workpiece.

6. The method of claim 1, further comprising synchronizing the test signal and the reference signal with each other.

7. The method of claim 1, wherein the defined multiple of the standard deviation value is obtained by choosing a factor specific for the workpiece and/or the step of finishing the surface and multiplying the factor with the standard deviation value.

8. A computer program product comprising a non-transitory computer readable medium storing computer readable computer program, wherein the computer program when loaded into a processor and executed by the processor causes the processor to perform the method of claim 1.

9. A manufacturing device, comprising:

a tool section comprising a tool for finishing a surface section of a workpiece by controlling the tool of the manufacturing device with a control signal, a measuring means configured to during the finishing of the surface of the workpiece:

measure a position of the tool to create a data point for each measured position of the tool, each data point including a sample of the position of the tool;

determine based on a plurality of the samples a reference signal representing a time dependent difference between an ideal tool position and a real tool position of the tool of the manufacturing device in a reference phase; and determine based on a plurality of the samples a test signal representing a time dependent difference between the ideal tool position and the real tool position of the tool of the manufacturing device in an operation phase, wherein the reference signal and the test signal relate to a finishing operation of the manufacturing device; and a calculating means configured to during the finishing of the surface of the workpiece;

determine a mean value and a standard deviation value from the reference signal for data points of a sliding window, with a size of the sliding window being individually defined for the workpiece to be finished, and with a finishing speed being a parameter when adjusting a sliding window size, determine data points of the test signal, where the test signal deviates from the mean value more than a defined multiple of the standard deviation value, and estimate a surface quality of the workpiece in response to the determined data points of the test signal.

10. The manufacturing device of claim 9, constructed in the form of a CNC machine.

11. The manufacturing device of claim 10, wherein the CNC machine is a milling machine.

* * * * *